UNITED STATES PATENT OFFICE.

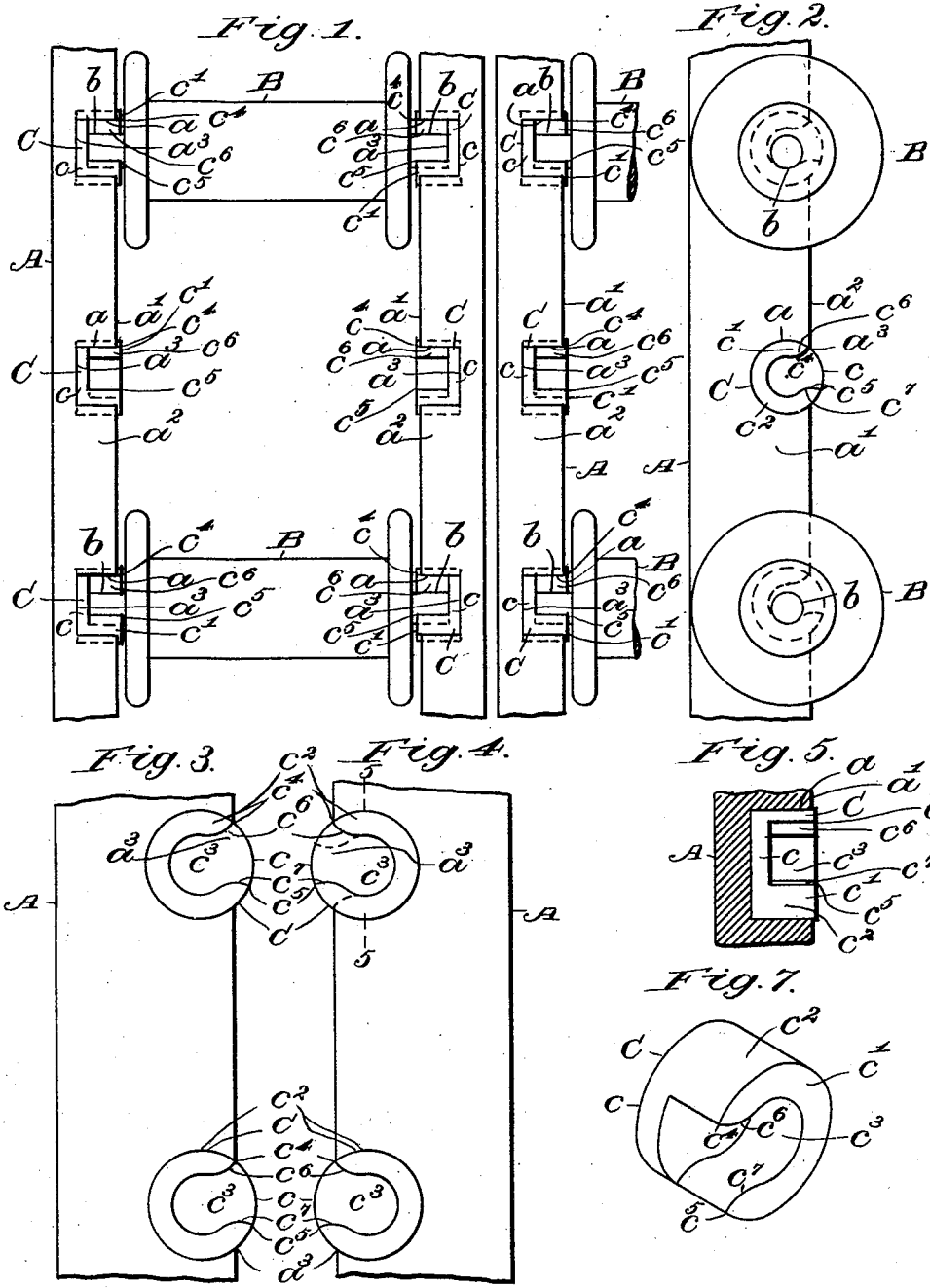

THOMAS C. ENTWISTLE, OF LOWELL, MASSACHUSETTS.

CREEL FOR WARPING-MACHINES.

SPECIFICATION forming part of Letters Patent No. 699,159, dated May 6, 1902.

Application filed October 31, 1899. Serial No. 735,390. (No model.)

*To all whom it may concern:*

Be it known that I, THOMAS C. ENTWISTLE, a citizen of the United States, and a resident of Lowell, in the county of Middlesex and State of Massachusetts, have invented certain new and useful Improvements in Creels for Warping-Machines, of which the following is a specification.

My invention relates to creels for warping-machines, and has for its object to provide such creels with bearings for the spools, which bearings are adapted to be used as a right-hand or left-hand bearing at will and which can be secured to the uprights of the creel at less expenditure of time and labor than is required in so securing bearings most nearly resembling these.

I use a bearing which is adapted to be secured in a recess made in a creel-upright and of such shape as to be formed by a single operation of any instrument capable of boring a cylindrical hole. The bearing comprises a circular end and a marginal flange or curb arranged perpendicularly to said end portion and extending nearly around said end, the whole forming a hollow cylinder with a closed end and with a lateral opening between the ends of said marginal curb, through which opening the journals of the spool may be introduced into said bearing. The ends of said flange or curb are preferably reduced to edges at the circumference of the hollow cylinder, the inner side of the flange being curved outward to the cylindrical surface of the bearing. The bearing may be made of any suitable material, as metal, but preferably of porcelain. The recess which receives the bearing is the greater segment of a hollow cylinder, the curved wall of the recess extending through four-fifths, more or less, of a circle— that is, the instrument by which the hole is bored is set with its center at a distance from the front of the upright less than the radius of said instrument to form a lateral opening through which the bearing projects from the front of said upright.

In the accompanying drawings, Figure 1 is a front elevation of parts of a creel-frame, showing uprights with my improved bearings; Fig. 2, a side view of one of the uprights with bearings and two spools supported therein; Fig. 3, an elevation of the inner face of the upright which supports one end of a spool; Fig. 4, an elevation of the inner face of the upright which supports the other end of the spool last named; Fig. 5, a vertical transverse section on the line 5 5 in Fig. 4; Fig. 6, a side elevation of a part of an upright with a recess to receive the bearing; Fig. 7, an isometric perspective view of a bearing detached.

The uprights or vertical posts A and spools B are of usual construction, the uprights being usually of wood and having in their sides bearing-grooves leading from their front faces to receive the journals $b$ of said spools. Glass bushings have heretofore been used at the closed ends of the grooves to form bearings for the spool-journals, said bushings being open in front to receive said journals, and such bushings requiring for their reception recesses at the closed ends of the grooves, these recesses necessitating a separate operation for their formation. I dispense with these grooves. I form the recesses in a convenient manner, as follows: I bore with a drill or any instrument adapted to make a cylindrical hole a recess $a$ in the side $a'$ of the upright A, placing the center of the drill at a distance from the front $a^2$ of the upright less than the radius of said drill and directing said drill at right angles to the side $a'$ and parallel with the front $a^2$ of said upright, so that the drill cuts through said front and leaves a horizontal opening $a^3$, and the recess is the segment of a hollow cylinder, in which the plane or section coincides with the front face of the upright $a^2$. In the recess $a$ I insert a bearing C, which comprises a circular end $c$ and a marginal flange or curb $c'$, arranged at right angles to the circular part $c$ and extending nearly around the margin of said part $c$, the outer surface $c^2$ of said flange coinciding with the circumference of said circular part and the inner surface $c^3$ of said flange being curved concentrically with the circle $c$, except near the ends $c^4$ $c^5$ of said flange, where said inner surface $c^3$ is preferably inclined or curved outward at $c^6$ $c^7$ to its outer surface $c^2$ to form an outwardly-flaring mouth, into which the journals $b$ of the spool B may be easily introduced. Both ends of the flange are alike, so that the bearing C may be used for a right-hand bearing or a left-hand bearing or either side up, as indicated by the full lines and dotted lines in the upper part of Fig. 4.

In use the lower end $c^5$ of the curb $c'$ projects from the front $a^2$ of the upright A, while the upper end $c^4$ of said curb is flush with said front, so that the mouth of the bearing descends from said front $a^2$ sufficiently to retain the journal of the spool.

Each bearing is cast or molded in a single piece, preferably from porcelain or other suitable material, and is retained in its recess by friction or, to avoid the necessity of very careful workmanship in forming said recess, by glue or cement or other suitable adhesive material.

I claim as my invention—

1. The combination with an upright, having a segmental, cylindrical recess, of a hollow cylindrical bearing, adapted to fill said recess and to project laterally therefrom and having a lateral opening.

2. The combination with an upright, having a segmental cylindrical recess, the plane of section or segmental base of said recess coinciding with the vertical face of said upright, of a bearing, having a circular end provided with an arc-shaped marginal flange or curb, arranged perpendicularly thereto, the inner face of said flange near the ends of said flange being inclined outward and meeting the outer curved face of the same and the lower end of said flange projecting beyond the face of said upright.

In testimony whereof I have affixed my signature in presence of two witnesses.

THOMAS C. ENTWISTLE.

Witnesses:
ALBERT M. MOORE,
MARY S. WOOD.